June 22, 1954     W. A. SCHAICH     2,681,540
GATHERING CHAIN DRIVE FOR CORN HARVESTERS
Filed Feb. 16, 1951
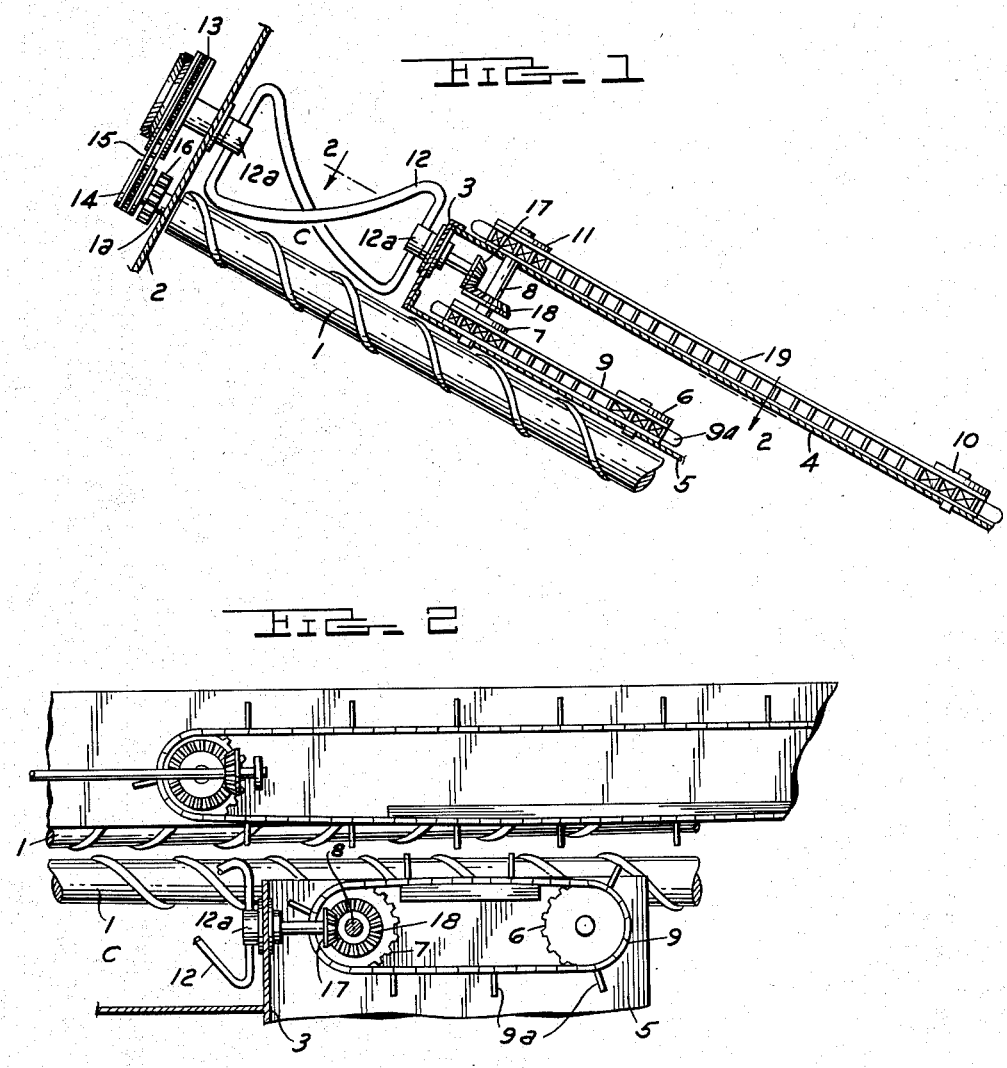
INVENTOR.
W. A. Schaich Patented June 22, 1954

2,681,540

UNITED STATES PATENT OFFICE 2,681,540

GATHERING CHAIN DRIVE FOR CORN HARVESTERS

Wilbur A. Schaich, Franklin, Mich., assignor, by mesne assignments, to Ford Motor Company, Dearborn, Mich., a corporation of Delaware Application February 16, 1951, Serial No. 211,301

3 Claims. (Cl. 56—108)

This invention relates to an improved gathering chain drive for a corn harvester and more particularly for a corn harvester utilizing a rotary snapping bar to assist the snapping rolls for removal of corn ears from the stalk.

The corn harvesting machines now in use by the modern farmer for harvesting his corn crop are on the whole efficient and generally satisfactory machines. In the development of such machines, however, there has been a tendency to evolve a rather complicated mechanism which utilizes a large number of parts thereby adding up to a high cost item. In these days of steel shortages and high costs it is important that the makers of harvesting machinery direct their attention to simplification of the design of such machines to reduce the cost of such machines where possible in order to keep the selling price within reach of the small farmer.

Accordingly, it is an object of this invention to provide an improved gathering chain drive for a corn harvesting machine.

Another object of this invention is to provide an improved drive for the gathering chains of a corn harvesting machine which has a rotatable corn ear snapping bar.

A further object of this invention is to provide an improved gathering chain drive for a corn harvesting machine wherein the rotary snapping bar of the corn harvesting machine is utilized to drive the gathering chains of the corn harvesting machine.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Fig. 1 is a fragmentary side sectional view of a portion of a corn harvesting machine showing the improved gathering chain drive constructed in accordance with this invention.

Fig. 2 is a sectional view taken along the plane 2—2 of Fig. 1.

As shown on the drawings:

This invention contemplates an improvement to the gathering chain driving mechanism of a corn harvesting machine of the type shown in U. S. Patent #2,121,859, to Curie et al. Such patent discloses a corn harvesting machine which has a pair of rearwardly inclined snapping rolls and a pair of gathering chains spaced one above the other and parallel to the snapping rolls for gathering the standing stalks of corn and to assist the feeding of such stalks into the snapping rolls so that the snapping rolls may remove the ears from the stalk. Adjacent the upper ends of the snapping rolls, there is provided a rotary snapping bar for removing unsnapped ears from the corn stalks. The snapping bar and the gathering chains are driven from the same power source by independent drive mechanisms.

Accordingly, there is shown in Figs. 1 and 2 the improved gathering chain driving arrangement constructed in accordance with this invention. In such figures, there are shown a pair of snapping rolls 1 which slope upwardly and rearwardly and are slightly spaced apart as shown in Fig. 2 to receive standing stalks of corn therebetween and to pull such stalks downwardly for removal of the corn ears therefrom in a well-known manner. The upper ends of snapping rolls 1 are journaled in a header portion 2 of the corn harvester. A wall 3 defines the forward limits of a corn snapping chamber C, as shown in Figs. 1 and 2, and a pair of gathering chain support boards 4 and 5 are respectively secured at their rear ends to the wall 3 in aligned, vertically spaced relationship. The gathering boards 4 and 5 are both disposed above the innermost snapping roll 1 as shown in Fig. 2 with the bottom board 5 being closely spaced above such snapping roll. The lower board 5 has a sprocket 6 journaled thereon at its lower end. A shaft 8 having its ends respectively journaled in boards 4 and 5 is perpendicularly disposed between said boards and is provided to rotatably drive a sprocket 7 keyed to said shaft adjacent the top surface of board 5. A gathering chain 9 having outwardly projecting stalk engaging fingers 9a surrounds sprockets 6 and 7. The board 4, which is approximately twice the length of board 5, has a sprocket 10 journaled on its lower forward end and a similar sprocket 11 is keyed to shaft 8 adjacent the top surface of board 4. A gathering chain 19, similar to chain 9, surrounds sprockets 10 and 11.

A spiral shaped snapping bar 12 has its ends respectively journaled in the header portion 2 and forward wall 3 of the snapping chamber. The axis of the snapping bar 12 is substantially parallel to the axis of the snapping rolls 1, and is disposed above the snapping rolls so that the edge thereof will lie adjacent the inside snapping roll 1 as best shown in Fig. 2. Snapping bar 12 has bearing shaft extensions 12a respectively provided at its journaled ends and the upper end of the rearwardly disposed shaft extension 12a has a sprocket 13 secured thereon. One of the pair of snapping rolls 1 has a sprocket 14 secured to the rear end of the bearing shaft portion 1a of snapping roll 1 which projects through header portion 2, and a chain 15 drivingly connects sprocket 14 to sprocket 13. A pair of cooperating gears 16 (only one of which is shown) provided on the bearing shafts 1a of the snapping rolls 1 effect driving engagement between the snapping rolls 1. Snapping rolls 1 are of course power-driven from the tractor power take-off not shown.

Bearing shaft extension 12a provided on the forward end of snapping bar 12 has a beveled gear 17 keyed thereto and such gear 17 cooperates in driving relationship with a ring gear 18 keyed on to shaft 8. Thus when snapping rolls 1 are rotated by the usual power drive connection (not shown), chain 15 engaging sprockets 13 and 14 effects rotation of snapping bar 12. Hence bevel gear 17 in turn will effect rotation of ring gear 18 to drive the gathering chains 9 and 19.

It will thus be apparent from the above description that there is here provided an improved drive for the gathering chains of a corn harvester which substantially reduces the manufacturing costs of the harvesting machine through the elimination of some of the operating parts. Not only is a simplification of the driving arrangement effected, but the maintenance of the machine is appreciably reduced.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a corn harvester, the combination of a pair of rotatable snapping rolls, a snapping bar journaled in the corn harvester at the upper ends of said rolls and adjacent one of said rolls, said snapping bar having bearing shaft extensions at its ends, means connecting one of said shaft extensions to said snapping rolls for rotatably driving said snapping bar, a gathering chain rotatably mounted on the corn harvester, and means operable by said other shaft extension for rotating said gathering chain.

2. In a corn harvester, the combination of a pair of rearwardly inclined rotatable snapping rolls, a snapping bar journaled in the corn harvester at the upper ends of said rolls and adjacent one of said rolls, said snapping bar having shaft extensions respectively projecting from said snapping bar journals, means drivingly connecting the uppermost shaft extension of said snapping bar with said snapping rolls, a pair of corn stalk gathering chains rotatably mounted on the harvester in aligned vertically spaced relationship adjacent one of said snapping rolls, said gathering chains having a common drive shaft whose axis is substantailly perpendicular to the axis of said snapping bar, and cooperating gear means on said lower shaft extension and said common drive shaft, whereby said gathering chains are rotated.

3. In a corn harvester having a header portion, a pair of forwardly extending downwardly inclined snapping rolls having their rear ends journaled in the header portion, a transverse forward wall portion disposed above said snapping rolls and defining a snapping chamber at the upper ends of said snapping rolls, a snapping bar, means for respectively journaling the ends of said snapping bar in said wall portion and the header for rotary movement within said snapping chamber, said snapping bar being disposed parallel and adjacent to one of said snapping rolls, a pair of shaft extensions respectively projecting from said snapping bar journals, means drivingly connecting the upper shaft extension with one of said snapping rolls, a pair of corn stalk gathering chains rotatably mounted on the harvester in aligned vertically spaced relationship adjacent the lower portions of one of said snapping rolls, a common drive shaft for said gathering chains, said drive shaft having its axis substantially perpendicular to the axis of said snapping bar, and cooperating gear means on said lower shaft extension and said common drive shaft for rotating said gathering chains.

References Cited in the file of this patent

UNITED STATES PATENTS

| Number | Name | Date |
|---|---|---|
| 1,136,624 | Small | Apr. 20, 1915 |
| 1,940,851 | Everett et. al. | Dec. 26, 1933 |
| 2,121,859 | Currie et al. | June 28, 1938 |